(12) United States Patent
Won

(10) Patent No.: US 6,339,457 B1
(45) Date of Patent: Jan. 15, 2002

(54) CASE FOR LIQUID CRYSTAL DISPLAY

(75) Inventor: Se Chang Won, Kyungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/257,189

(22) Filed: Feb. 25, 1999

(30) Foreign Application Priority Data

Feb. 25, 1998 (KR) .............................................. 98-6027

(51) Int. Cl.⁷ .......................................... G02F 1/1333
(52) U.S. Cl. ...................................................... 349/58
(58) Field of Search ............................................ 349/58

(56) References Cited

U.S. PATENT DOCUMENTS 4,294,517 A * 10/1981 Jakubek ........................ 349/58
5,274,486 A * 12/1993 Yamazaki et al. ............. 349/58
5,654,779 A * 8/1997 Nakayama et al. ........... 349/58
5,946,062 A * 8/1999 Hasegawa et al. ............ 349/58

* cited by examiner

Primary Examiner—William L. Sikes
Assistant Examiner—Tarifur R. Chowdhury
(74) Attorney, Agent, or Firm—Long Aldridge & Norman LLP

(57) ABSTRACT

A liquid crystal display case surrounds the liquid crystal display device by a frame and top case. The top case has a hooking plate extended inwardly from the top end of the front wall in the perpendicular direction. The frame is engaged with the top case by being inserted under the hooking plate so that the frame is combined with the liquid crystal display device.

24 Claims, 3 Drawing Sheets

CASE FOR LIQUID CRYSTAL DISPLAY

This application claims the benefit of Korean Patent Application No. 98-6027, filed on Feb. 25, 1998, which is hereby incorporated by reference.

BACKGROUND OF THE INVENTION

1. Field of the Invention

The present invention relates to a liquid crystal display device, and more particularly, to a case for a liquid crystal display apparatus.

2. Discussion of the Related Art

Generally, a conventional liquid crystal module is composed of a liquid crystal panel and a drive circuit for driving the liquid crystal panel. The liquid crystal panel includes liquid crystal cells arranged in a matrix pattern between two glass substrates, and switching elements for each switching signal to be applied to the liquid crystal cell. Since such liquid crystal module has the glass substrates, the liquid crystal module may be damaged by an exterior impact. To prevent such damage of the liquid crystal module, a case has been employed for surrounding the exterior of the liquid crystal module for protection.

Referring to FIG. 1, the liquid crystal display case includes a frame 10 made from a plastic material and a top case 20 engaging the frame 10 to surround a liquid crystal module 30. Between the frame 10 and the liquid crystal display module 30, there are installed a back light lamp, light guiding plate, reflective layer, diffusion layer, and concentration sheets (not shown) on the plastic frame 10. The plastic frame 10 is called the "back light unit" because the back light lamp is installed thereon. The liquid crystal display module 30 is composed of a liquid crystal panel 32, first and second PCBs (Printed Circuit Board) 34 and 36 respectively installed at the rear and left edges of the liquid crystal panel 32. The liquid crystal display module 30 is fixed at the plastic frame 10 by attaching the front edge of the liquid crystal panel 32 into hooks 12 formed on the plastic frame 10. Then, the first PCB 34 is folded to surround the rear edge of the plastic frame 10, and located at the rear edge of the surface of the plastic frame 10. Similarly, the second PCP 36 is folded to surround the left edge of the plastic frame 10, and located at the left edge of the surface of the plastic frame 10. Such plastic frame 10 combined with the liquid crystal display module 30 is loaded onto the top case 20 before being secured by an engaging means. The LCD module 30 is fixed without movement in the top case 20. The engaging means includes fixed protrusions 16 protruding from the front face of the plastic frame 10, fixed holes 24 formed on the front wall 20a of the top case 20, and hooking jaws 26 provided at each top edge of the fixed holes 24. Each of the fixed protrusions 16 is inserted into the fixed hole 24. The hooking jaw 26 allows the fixed protrusion to be retained in the fixed hole 26. Also, the engaging means includes hooking wings or blades or fingers 28 formed at each center and top edge of the side walls 20b and 20c, and at both end of the rear wall 20d. Each of the hooking wings 28 is flexed or bent by a manufacturer toward the inside to prevent the movement of the plastic frame 10 in the vertical direction. Furthermore, the engaging means includes screw holes 18 formed at each corner of the plastic frame 10, and screw holes 29 provided at each corner of the top case 20. Screws pass through the respective screw holes 18 on the plastic frame 10 and the screw holes 29 on the top case 20 to closely couple or attach the plastic frame 10 to the top case 20.

In such a liquid crystal display case of FIG. 1, the coupling or attaching processes are complex and require much time because the engaging means has a complex structure. Also, the fixed protrusion may be damaged and the liquid crystal display case may be undesirably modified, because of the interference from the hooking jaw when coupling or combining the liquid crystal display case. Because of this, it is difficult to closely couple or combine the liquid crystal display case and the quality of the liquid crystal display apparatus deteriorates.

SUMMARY OF THE INVENTION

Accordingly, the present invention is directed to a case for a liquid crystal display that substantially obviates one or more of the problems due to limitations and disadvantages of the related art.

An object of the present invention is to provide a liquid crystal display case that is adapted to prevent the damage of a liquid crystal display device such as by an exterior impact or a vibration.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display case according to one aspect of the present invention includes a frame for supporting a liquid crystal display device; a top case receiving the frame to surround the liquid crystal display device; and engaging means allowing the frame and the top case to be engaged each other by loading the frame into the top case.

In another aspect of the present invention, a portable computer having a case for a liquid crystal display device comprises a frame for supporting the liquid crystal display device; a top case receiving the frame and substantially surrounding the liquid crystal display device; and an engaging unit attaching the frame to the top case by loading the frame onto the top case.

In another aspect of the present invention, a case for a display panel comprises a frame having a hook and a protrusion; a top case having first, second, third, and fourth side walls, and a portion for receiving the protrusion from the frame; a display panel attached to the frame through the hook, the display panel being between the plastic frame and the top case, wherein the frame with the display panel is loaded onto the top case.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
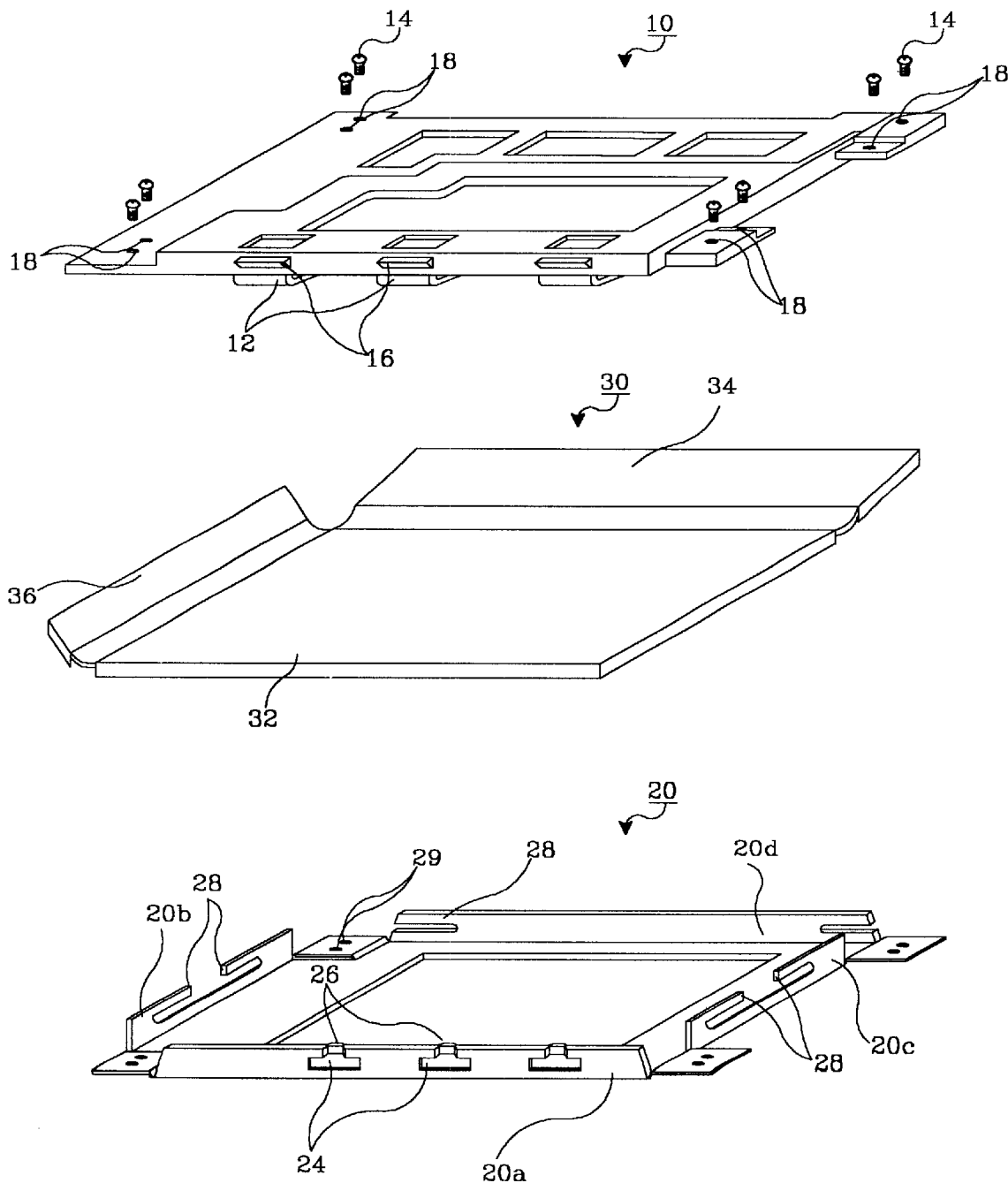
FIG. 1 is an exploded perspective view showing a case for a conventional liquid crystal display device.
Figure 2:
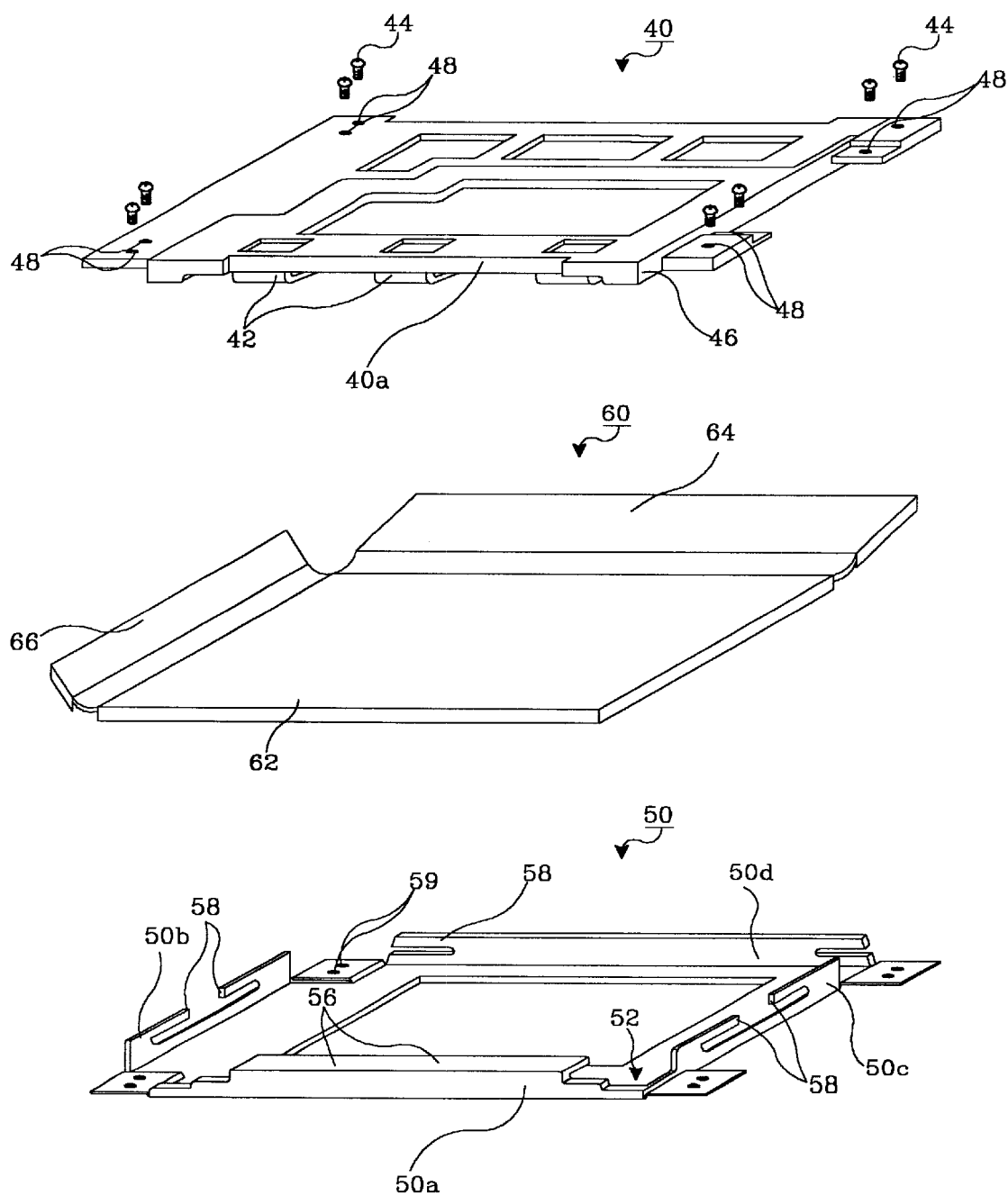
FIG. 2 is an exploded perspective view showing a case for a liquid crystal display device according to an embodiment of the present invention.

Referring to FIG. 2, there is illustrated a liquid crystal display case according to an embodiment of the present invention. The case surrounds a liquid crystal display device 60 to protect the liquid crystal display device from exterior impact or vibration, for example. In FIG. 2, the liquid crystal display device 60 includes first and second PCBs 64 and 66 each installed at the rear and left of a liquid crystal panel 62. The liquid crystal panel 62 includes a plurality of liquid crystal cells arranged in a matrix pattern. The liquid crystal cells each form a picture element. In the first and second PCBs 64 and 66, there are included driving circuits for driving the liquid crystal matrix on the liquid crystal panel 62. The front edge of the liquid crystal display device 60 is inserted into hooks 42 formed in a plastic frame 40, thereby combining the LCD device 60 to the plastic frame 40. Then, the first PCB 64 is folded to surround the rear edge of the plastic frame 40 and located at the rear on the surface of the plastic frame 40. Similarly, the second PCB 66 is folded to surround the left edge of the plastic frame 40 and located at the left side on the surface of the plastic frame 40. Such plastic frame 40 combined with the liquid crystal display device 60 is loaded onto a top case 50 for engagement with the top case 50, without allowing movement.

The liquid crystal display case according to an embodiment of present invention further includes an engaging unit which engages the plastic frame 40 with the top case 50. The engaging unit includes bulges or protrusions 46 formed downwardly at the front corners of the plastic frame 40, curves 52 provided at the front corners of the top case 50, and a hooking plate 56 located between the curves 52. The front portion of the plastic frame 40 is inserted toward the inside of the hooking plate 56 of the top case 50 to load the bulges 46 into the curves 52, respectively, thereby engaging with the top case 50. The hooking plate 56 is extended inwardly from the top end of the front wall 50a of the top case 50, preferably in the perpendicular direction. A recessed portion 40a between two bulges 46 receives the hooking plate 56, which helps to lock the plastic frame to the top case. To this end, the front end of the top case has the shape of, for example, "[". As a result, the front end of the plastic frame 40 inserted into the front end of the top case 50 does not move in the vertical direction. Also, each of the bulges 46 is engaged with the curve 52 to combine closely or attach the plastic frame 40 to the top case 50. Consequently, the engaging unit allows the plastic frame 40 and the top case 50 to be engaged with each other by a simple assembling process of inserting the plastic frame 40 into the top case 50. Thus, the process of engaging the plastic frame 40 to the top case 50 is simplified, and can be done in a very short time.

Also, the engaging unit includes hooking wings or blades or fingers 58 formed at each center and top edge of the side walls 50b and 50c, and at both end of the rear wall 50d. Each hooking wing 58 is flexed by a manufacturer toward the inside to prevent the movement of the plastic frame 40 in the vertical direction. Furthermore, the engaging unit includes screw holes 48 formed at each corner of the plastic frame 40, and screw holes 59 provided at each corner of the top case 50. Screws pass through the screw holes 48 on the plastic frame 40 and the screw holes 59 on the top case 50 to closely couple or attach the plastic frame 40 to the top case 50.

Figure 3:
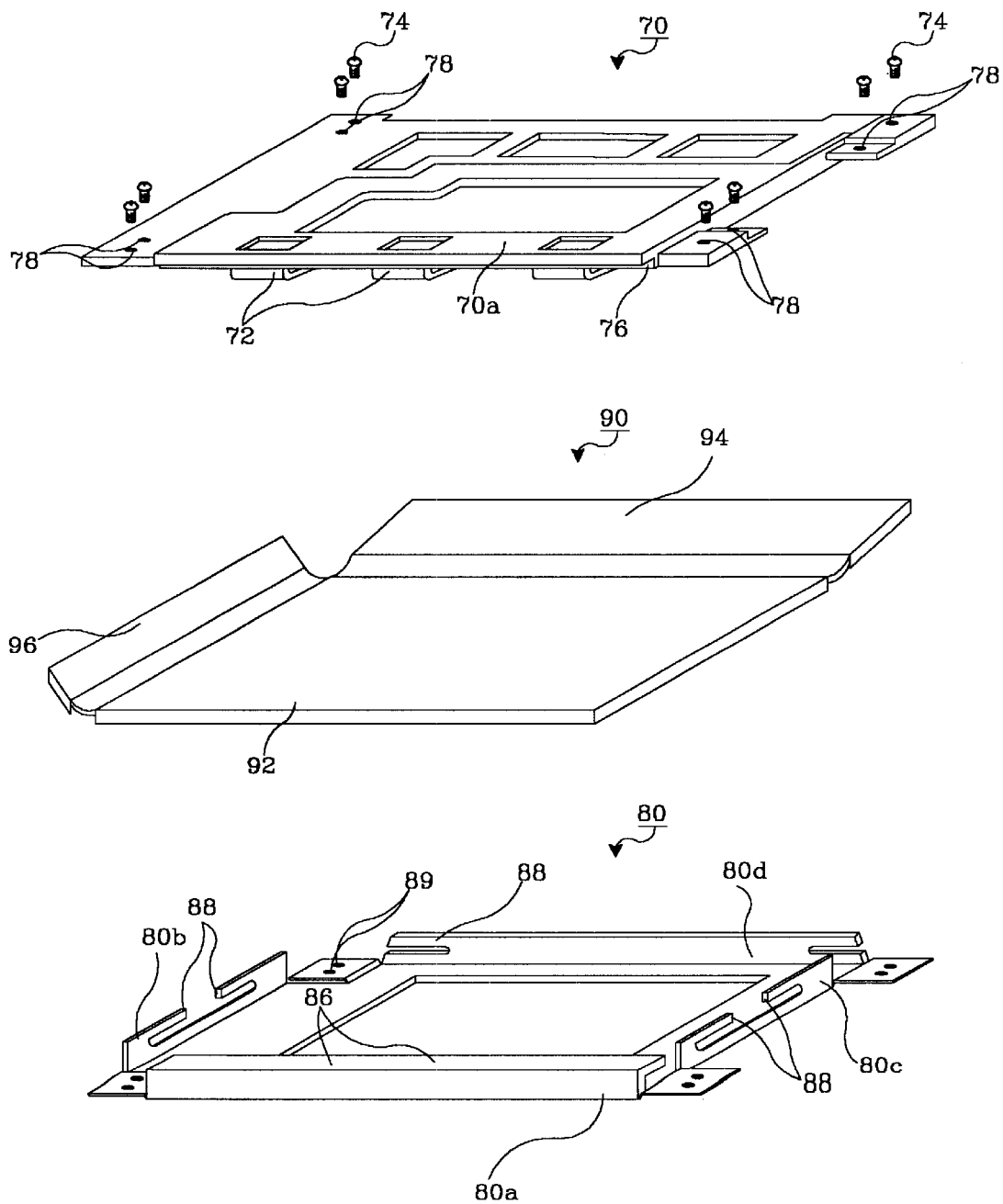
FIG. 3 is an exploded perspective view showing a case for a liquid crystal display device according to another embodiment of the present invention.

FIG. 3 shows a liquid crystal display case according to another embodiment of the present invention. The case surrounds a liquid crystal display device 90 to protect the liquid crystal display device from exterior impact or vibration, for example. In FIG. 3, the liquid crystal display device 90 includes first and second PCBs 94 and 96 installed at the rear and left of a liquid crystal panel 92, respectively. The liquid crystal panel 92 includes a plurality of liquid crystal cells arranged in a matrix pattern. Each of the liquid crystal cells forms a picture element. In the first and second PCBs 94 and 96, there are included driving circuits for driving the liquid crystal matrix on the liquid crystal panel 92. The front edge of the liquid crystal display device 90 is inserted into hooks 72 formed in a plastic frame 70, thereby combining with the plastic frame 70. Then, the first PCB 94 is folded to surround the rear edge of the plastic frame 70 and located at the rear on the surface of the plastic frame 70. Similarly, the second PCB 96 is folded to surround the left edge of the plastic frame 70 and located at the left side on the surface of the plastic frame 70. Such plastic frame 70 combined with the liquid crystal display device 90 is loaded onto a top case 80 to engage with the top case 80, without allowing movement. The top case 80 protects the surface and the side faces of the liquid crystal display device 90 from being damaged due to an exterior impact or a vibration, for example.

The liquid crystal display case according to another embodiment of the present invention further includes an engaging unit for closely engaging the plastic frame 70 with the top case 80. The engaging unit includes an undercutting portion 76 formed at the front face of the plastic frame 70, and a hooking plate 86 provided at the top end of the front wall 80a of the top case 80. The front portion of the plastic frame 70 is inserted toward the inside of the hooking plate 86 of the top case 80 to engage with the top case 80. The hooking plate 86 is extended inwardly from the top end of the front wall of the top case 80 in the perpendicular direction. To this end, the front end of the top case 80 has the shape of, for example, "[". As a result, the front end of the plastic frame 70 inserted into the front end of the top case 80 does not move in the vertical direction. The engaging unit having the above configuration allows the plastic frame 70 and the top case 80 to be engaged with each other by a simple assembling process by inserting the plastic frame 70 into the top case 80. Thus, the process of engaging the plastic frame 70 to the top case 80 is simplified, and can be done in a very short time.

Furthermore, the engaging unit includes hooking wings or blades or fingers 88 formed at each center and top edge of the side walls 80b and 80c, and at both ends of the rear wall 80d. Each of the hooking wings 88 is flexed or bent by a manufacturer toward the inside to prevent the movement of the plastic frame 70 in the vertical direction. Also, the engaging unit includes screw holes 78 formed at each corner of the plastic frame 70, and screw holes 89 provided at each corner of the top case 80. Screws pass through the screw holes 78 on the plastic frame 70 and the screw holes 89 on the top case 80 to couple or attach closely the plastic frame 70 to the top case 80.

As described above, the liquid crystal display case according to the present invention allows the plastic frame combined with the liquid crystal display device to engage with the top case by a hooking plate formed in the top case such that the plastic frame does note move in the vertical direction. To this end, the liquid crystal display case according to the present invention surrounds the liquid crystal display device by the plastic frame engaged with the top case to prevent the liquid crystal display device from being damaged. The liquid crystal display case according to the present invention enables the plastic frame with the top case by a simple combining process of inserting the plastic frame into the top case. As a result, process of engaging the plastic frame with the top case is simplified, and can be done in a very short time.

It will be apparent to those skilled in the art that various modifications and variation can be made in the case for a liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display assembly, comprising:
    a frame having a front with an edge protrusion, a recessed portion, and an adjacent hook;
    a liquid crystal display received by said hook; and
    a top case having a front wall with an inwardly protruding hooking plate and with a matching structure, said top case further including a first side having a first side wall with a first hooking blade, a second side having a second side wall with a second hooking blade, and a rear wall;
    wherein said top case receives said frame and said liquid crystal display such that said edge protrusion mates with said matching structure, such that said recessed portion aligns with said protruding hooking plate, and such that said first hooking blade and said second hooking blade fold over said frame.

2. A liquid crystal display assembly according to claim 1, wherein said protruding hooking plate and said recessed portion prevent movement of the frame in the top case in a first direction.

3. A liquid crystal display assembly according to claim 2, wherein said edge protrusion and said matching structure prevent movement of the frame in the top case in a second direction.

4. A liquid crystal display assembly according to claim 1, wherein said edge protrusion and said matching structure are curved.

5. A liquid crystal display assembly according to claim 1, wherein said frame further includes a first side having first holes and a second side having second holes, wherein said first side of said top case further includes third holes, wherein said second side of said top case further includes fourth holes, and wherein said first holes and said third holes align, and wherein said second holes and said fourth holes align.

6. A liquid crystal display assembly according to claim 1, wherein said frame is comprised of plastic.

7. A liquid crystal display assembly according to claim 1, wherein said rear wall has a third hooking blade that is folded over said frame.

8. A liquid crystal display assembly, comprising:
    a frame having a front with an undercut portion, and an adjacent hook;
    a liquid crystal display received by said hook; and
    a top case having a front wall with an inwardly protruding hooking plate, a first side having a first side wall with a first hooking blade, a second side having a second side wall with a second hooking blade, and a rear wall;
    wherein said top case receives said frame and said liquid crystal display such that said front of said frame mates with said protruding hooking plate, and such that said first hooking blade and said second hooking blade fold over said frame.

9. A liquid crystal display assembly according to claim 8, wherein said protruding hooking plate and said front of said frame prevent movement of the frame in the top case in a first direction.

10. A liquid crystal display assembly according to claim 8, wherein said frame further includes a first side having first holes and a second side having second holes, wherein said first side of said top case further includes third holes, wherein said second side of said top case further includes fourth holes, and wherein said first holes and said third holes align, and wherein said second holes and said fourth holes align.

11. A liquid crystal display assembly according to claim 8, wherein said frame is comprised of plastic.

12. A liquid crystal display assembly according to claim 8, wherein said rear wall includes a third hooking blade that is folded over said frame.

13. A portable computer having a liquid crystal display device, comprising:
    a frame having a front with an edge protrusion, a recessed portion, and a plurality of hooks adjacent said recessed portion;
    a liquid crystal display received by said hooks; and
    a top case having a front wall with an inwardly protruding hooking plate and with a matching structure, said top case further including a first side having a first side wall with a first set of hooking blades, a second side having a second side wall with a second set of hooking blades, and a rear wall;
    wherein said top case receives said frame and said liquid crystal display such that said edge protrusion mates with said matching structure, such that said recessed portion aligns with said protruding hooking plate, and such that said first set of hooking blades and said second set of hooking blades fold over said frame.

14. A portable computer according to claim 13, wherein said protruding hooking plate and said recessed portion prevent movement of the frame in the top case in a first direction.

15. A portable computer according to claim 14, wherein said edge protrusion and said matching structure prevent movement of the frame in the top case in a second direction.

16. A portable computer according to claim 13, wherein said edge protrusion and said matching structure are curved.

17. A portable computer according to claim 13, wherein said frame further includes a first side having first holes and a second side having second holes, wherein said first side of said top case further includes third holes, wherein said second side of said top case further includes fourth holes, and wherein said first holes and said third holes align, and wherein said second holes and said fourth holes align.

18. A portable computer according to claim 13, wherein said frame is comprised of plastic.

19. A portable computer according to claim 13, wherein said rear wall has a third set of hooking blades that are folded over said frame.

20. A portable computer, comprising:
    a frame having a front with an undercut portion, and a plurality of hooks adjacent said undercut portion;
    a liquid crystal display received by said hooks; and
    a top case having a front wall with an inwardly protruding hooking plate, a first side having a first side wall with a fist set of hooking blades, a second side having a second side wall with a second set of hooking blades, and a rear wall;

wherein said top case receives said frame and said liquid crystal display such that said front of said frame mates with said protruding hooking plate, and such that said first set of hooking blades and said second set of hooking blades fold over said frame.

21. A portable computer according to claim 20, wherein said protruding hooking plate and said front of said frame prevent movement of the frame in the top case in a first direction.

22. A portable computer according to claim 20, wherein said frame further includes a first side having first holes and a second side having second holes, wherein said first side of said top case further includes third holes, wherein said second side of said top case further includes fourth holes, and wherein said first holes and said third holes align, and wherein said second holes and said fourth holes align.

23. A portable computer according to claim 20, wherein said frame is comprised of plastic.

24. A portable computer according to claim 20, wherein said rear wall includes a third set of hooking blades that are folded over said frame.

* * * * *